(12) United States Patent
Reiners et al.

(10) Patent No.: US 11,044,848 B2
(45) Date of Patent: Jun. 29, 2021

(54) BEARING HOUSING

(71) Applicant: DEERE & COMPANY, Moline, IL (US)

(72) Inventors: Alexander C. Reiners, Thibodaux, LA (US); John A. Dighton, Thibodaux, LA (US); Guy Burch, Thibodaux, LA (US); Blake C. Gettig, Thibodaux, LA (US); Surfraj Fattepur, Pune (IN); Todd J. Rodrigue, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/431,852

(22) Filed: Jun. 5, 2019

(65) Prior Publication Data
US 2020/0386268 A1 Dec. 10, 2020

(51) Int. Cl.
*F16C 41/00* (2006.01)
*A01D 45/10* (2006.01)

(52) U.S. Cl.
CPC .......... *A01D 45/10* (2013.01); *F16C 2233/00* (2013.01); *F16C 2310/00* (2013.01)

(58) Field of Classification Search
CPC .... F16C 19/386; F16C 19/548; F16C 41/007; F16C 2229/00; F16C 2233/00; A01D 45/10; A01B 61/02; A01B 61/025
See application file for complete search history.

(56) References Cited

U.S. PATENT DOCUMENTS

| | | | |
|---|---|---|---|
| 3,772,547 A | 11/1973 | Abate | |
| 5,051,693 A * | 9/1991 | Brauer | F16C 35/077 324/207.22 |
| 6,174,088 B1 * | 1/2001 | Miyazaki | G01P 1/00 324/207.25 |
| 6,254,196 B1 * | 7/2001 | Gee | B60B 27/00 301/105.1 |
| 6,543,858 B1 * | 4/2003 | Melton | B60B 27/00 301/137 |

(Continued)

FOREIGN PATENT DOCUMENTS

| | | |
|---|---|---|
| BR | 102014021086-5 A2 | 4/2016 |
| DE | 10063620 A1 | 6/2001 |
| EP | 0426298 A1 | 5/1991 |

OTHER PUBLICATIONS

ASSY; 1 page.

*Primary Examiner* — Phillip A Johnson
(74) *Attorney, Agent, or Firm* — Taft Stettinius & Hollister LLP; Stephen F. Rost

(57) ABSTRACT

A bearing coupler assembly that has a bearing housing sized to at least partially receive a bearing assembly, the bearing housing defining a bearing axis therethrough, a shaft positioned at least partially through the bearing housing along the bearing axis, the shaft defining a shaft lip and a fastener end, the bearing assembly coupling the shaft to the bearing housing so the shaft can rotate about the bearing axis relative to the bearing housing, a fastener configured to be coupled to the fastener end of the shaft, a tone wheel positioned axially along the bearing axis between the fastener and the bearing assembly, the tone wheel having at least one indicator, a sensor coupled to the bearing housing and configured to identify when the indicator passes thereby.

11 Claims, 5 Drawing Sheets

(56) References Cited

U.S. PATENT DOCUMENTS 6,695,483 B2 * 2/2004 Sakatani ................ B61F 15/20
384/448
7,934,777 B1 5/2011 Yuhas

* cited by examiner

BEARING HOUSING

FIELD OF THE DISCLOSURE

The present disclosure relates to a bearing housing and more particularly to a bearing housing that houses a sensor.

BACKGROUND

During operation of a sugarcane harvesting machine, sugarcane crop is generally cut near the soil in which it grows. As the crop is harvested, it is cut into smaller pieces referred to as cane billets. The billets can reach a rearward portion of the machine where it travels along a conveyor and is transported to a cart or wagon. Many sugarcane harvesting machines utilize an extractor to extract trash and debris from a cleaning chamber. The extractor is often a fan positioned within ductwork to pull the trash and debris from the cleaning chamber. The fan has sufficient power to draw the trash and debris through the ductwork and fan and expel the trash and debris away from the sugarcane harvesting machine.

The fan may be coupled to and powered by a motor. Often, the fan may become imbalanced as it rotates. An imbalanced fan will cause wear to the bearings of the motor among other things. Often, when the bearings of the motor become worn, the entire motor is replaced.

SUMMARY

One embodiment is a bearing coupler assembly that has a bearing housing sized to at least partially receive a bearing assembly, the bearing housing defining a bearing axis therethrough, a shaft positioned at least partially through the bearing housing along the bearing axis, the shaft defining a shaft lip and a fastener end, the bearing assembly coupling the shaft to the bearing housing so the shaft can rotate about the bearing axis relative to the bearing housing, a fastener configured to be coupled to the fastener end of the shaft, a tone wheel positioned axially along the bearing axis between the fastener and the bearing assembly, the tone wheel having at least one indicator, a sensor coupled to the bearing housing and configured to identify when the indicator passes thereby. Wherein, the tone wheel rotates with the shaft and the sensor is configured to identify the rotation speed of the tone wheel. Further wherein, the fastener applies a force on the tone wheel towards the shaft lip to provide an axial load to the bearing assembly.

One example of this embodiment has a sensor port defined in the bearing housing, wherein the sensor port establishes a calibration distance to the tone wheel. In another example, the at least one indicator is a radial extension defined in the tone wheel. In yet another example, the at least one indicator includes a plurality of radial extensions defined in the tone wheel. In one example of this embodiment the fastener end of the shaft is threaded and the fastener is a nut, in this example the nut is threadably coupled to the fastener end at a torque value to apply an axial force on the tone wheel. In yet another example, the tone wheel directly contacts the fastener. In one example, the fastener applies an axial force to the tone wheel towards the bearing assembly to compress the bearing assembly between the tone wheel and the shaft lip.

In yet another example, the bearing assembly comprises at least one tapered roller bearing. In one aspect of this example, the bearing assembly comprises a first tapered roller bearing and a second tapered roller bearing. In yet another aspect of this example the first and second tapered roller bearings are positioned substantially one-hundred and eighty degrees opposed to one another along the bearing axis so an inner race of the first bearing contacts the tone wheel and an inner race of the second bearing contacts the shaft lip.

In another example of this embodiment the shaft defines a motor shaft coupler. In one aspect of this example the motor shaft coupler is a splined recess defined within the shaft. In another aspect of this example the motor shaft coupler is defined at least partially radially inward of the tone wheel.

Another embodiment of this disclosure is an extractor assembly that has a frame structure configured to couple the extractor assembly to a work machine, a support tube coupled to the frame structure along a bearing axis, a fan coupled to the support tube to rotate about the bearing axis relative to the support tube. Wherein, the fan is rotationally coupled to the support tube through a bearing coupler assembly and the bearing coupler assembly has a bearing housing sized to at least partially receive a bearing assembly, a shaft positioned at least partially through the bearing housing along the bearing axis, the shaft defining a shaft lip, a fastener end, and a fan coupler end, the bearing assembly coupling the shaft to the bearing housing so the shaft can rotate about the bearing axis to rotate the fan coupled to the fan coupler end, a fastener configured to be coupled to the fastener end of the shaft, a tone wheel positioned axially along the bearing axis between the fastener and the bearing assembly, the tone wheel having an indicator, a sensor coupled to the bearing housing and configured to identify when the indicator passes thereby. Wherein, the tone wheel rotates with the fan and the sensor is configured to identify the rotation speed of the fan. Further wherein, the fastener compresses the bearing assembly between the tone wheel and the shaft lip.

One example of this embodiment has a motor configured to rotate the fan, wherein the motor is coupled to the shaft through a motor shaft coupler. In one aspect of this disclosure, the motor shaft coupler is a splined recess defined within the shaft. In another aspect of this dexample, the motor has a motor housing, wherein the motor housing is coupled to the bearing housing. In part of this aspect, the bearing housing is coupled to an end plate of the support tube.

Yet another embodiment of this disclosure is a harvesting machine that has a main frame, at least one ground-engaging mechanism for supporting the main frame, a feed mechanism configured to receive a crop and chop it into billets, a cleaning chamber having a primary extractor coupled to a the harvesting machine with a frame structure. Wherein, the primary extractor further has a fan assembly for directing flow through a duct, the fan assembly having a support tube coupled to the frame structure, a motor having a motor shaft, a bearing coupler assembly having a bearing shaft rotationally coupled to a bearing housing with a bearing assembly, the motor shaft being removably coupled to the bearing shaft on one end and the fan being coupled to the other end of the bearing shaft. Wherein, the bearing coupler assembly contains a tone wheel and a sensor and is configured to identify the rotation speed of the fan.

In one example of this embodiment, the bearing assembly is positioned between a fastener end and a shaft lip of the bearing shaft, wherein a fastener is coupled to the fastener end to apply an axial load on the bearing assembly by applying an axial force to the tone wheel towards the shaft lip.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
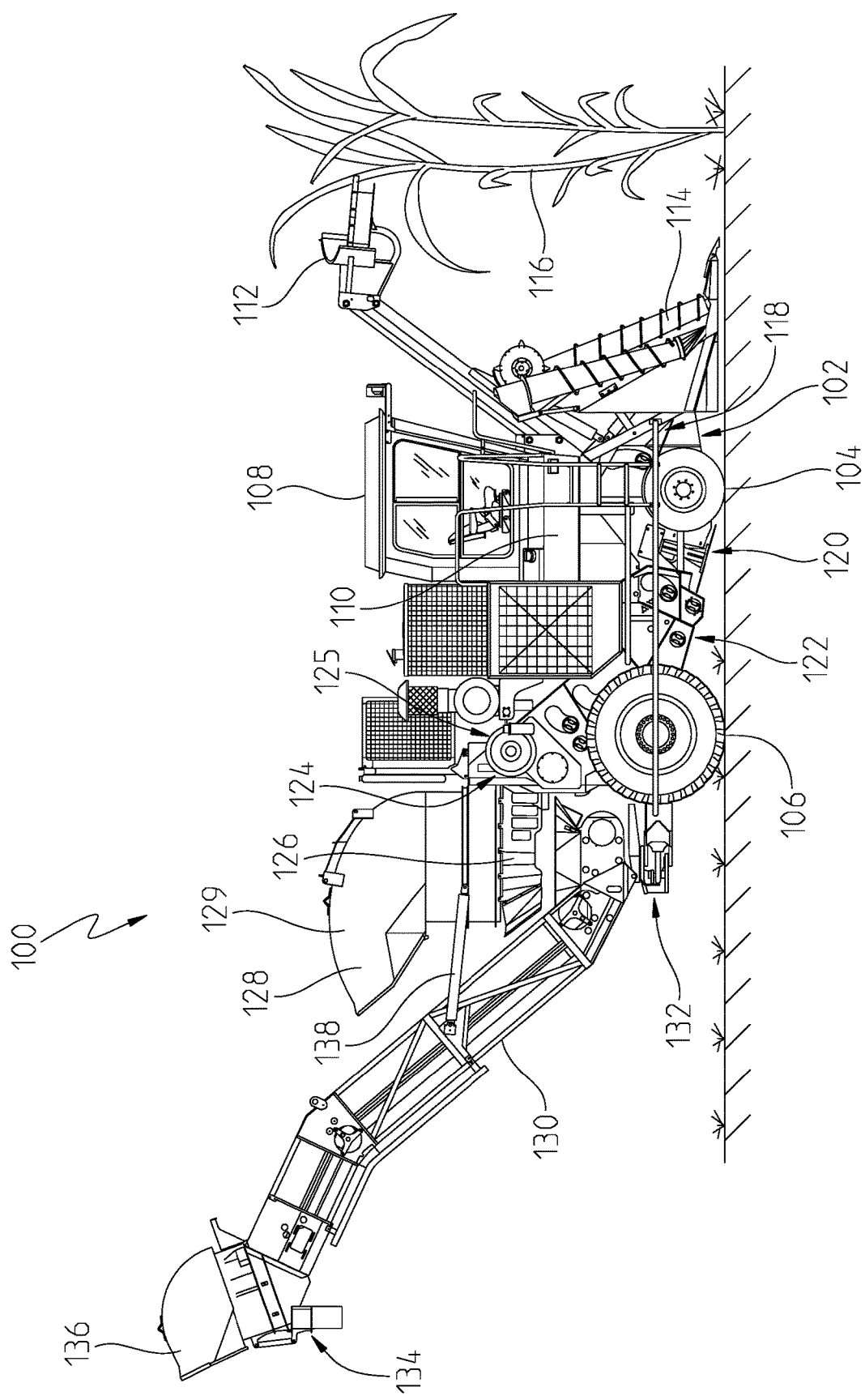
FIG. 1 is a side view of a sugarcane harvesting machine.

Turning now to FIG. 1 of this disclosure, an embodiment of a sugarcane harvesting machine 100 is shown. The harvester or machine 100 is presented in a side view in FIG. 1, with the front of the machine 100 facing to the right. Accordingly, certain left-side components of the machine 100 may not be visible in FIG. 1.

The machine 100 may include a main frame 102 supported on ground engaging mechanisms such as track assemblies or wheels (i.e., a front wheel 104 and a rear wheel 106), with a cab 108 adapted to house an operator. The cab 108 may include a plurality of controls for controlling the operation of the machine 100. An engine 110 or other power system may supply power for driving the machine 100 along a field and for powering various driven components of the machine. In certain embodiments, the engine 110 may directly power a hydraulic pump, a pneumatic pump, an electric generator and other devices and various driven components of the harvester may be powered by hydraulic, pneumatic, or electric motors receiving power from the hydraulic pump, pneumatic pump, or stored electrical energy from the generator.

A cane topper 112 may extend forward of the frame 102 in order to remove the leafy tops of sugarcane plants 116, and a set of crop dividers 114 (only the right-side divider shown in FIG. 1) may then guide the remainder of the sugarcane toward internal mechanisms of the machine 100 for processing. As the sugarcane harvesting machine 100 moves across a field, plants 116 passing between the crop dividers 114 may be deflected downward by one or more knockdown rollers 118 before being cut near the base of the plants by a base cutter assembly 120 mounted on the main frame 102. Rotating disks, guides, or paddles on the base cutter assembly 120 may further direct the cut ends of the plants upwardly and rearward within the harvester 100 toward a feeding mechanism 125 such as successive pairs of upper and lower feed rollers. The feeding mechanism may be rotatably supported by a chassis 122, and may be rotatably driven by a hydraulic or electric motor or other device in order to convey the stalks toward a chopper drum module 124 for chopping into relatively uniform billets.

The chopper drum module 124 may include upper and lower chopper drums which may rotate in opposite directions around, respectively, parallel axes in order to chop the passing stalks into billets and propel the billets into a cleaning chamber 126 at the base of a first or primary extractor 128. The first extractor 128 may utilize a powered fan to extract trash and debris from the cleaning chamber 126.

As also shown in FIG. 1, a loading conveyor or elevator system 130 may be provided at a rear portion of the harvester. The loading conveyor or elevator system 130 may include a forward end located at the bottom of the cleaning chamber 126, and the system may then convey the cleaned billets upward to a discharge location 134 near or below a second extractor 136. The billets may be discharged via the second extractor 136 into a trailing truck, cart, wagon or other receptacle.

The elevator or conveyor system 130 may be coupled to a swing table or pivot bearing 132, as shown in FIG. 1. As such, the entire system 130 is capable of pivoting up to or about 180° to unload the billets from either side of the machine 100.

In one aspect of this disclosure, the first extractor 128 may be located adjacent a basket and have a duct 129 positioned partially there around. During operation, the sugarcane billets may pass through the basket and be received at a first end of a conveyor. The first extractor 128 may include a fan assembly or other similar apparatus for drawing debris (i.e., leaves) and other impurities from the sugarcane billets that are received by the inclined conveyor. The duct 129 may be coupled to the primary extractor 128 to generate a flow path for the air and debris as it is drawn through the extractor 128 by the fan assembly.

Figure 2A:
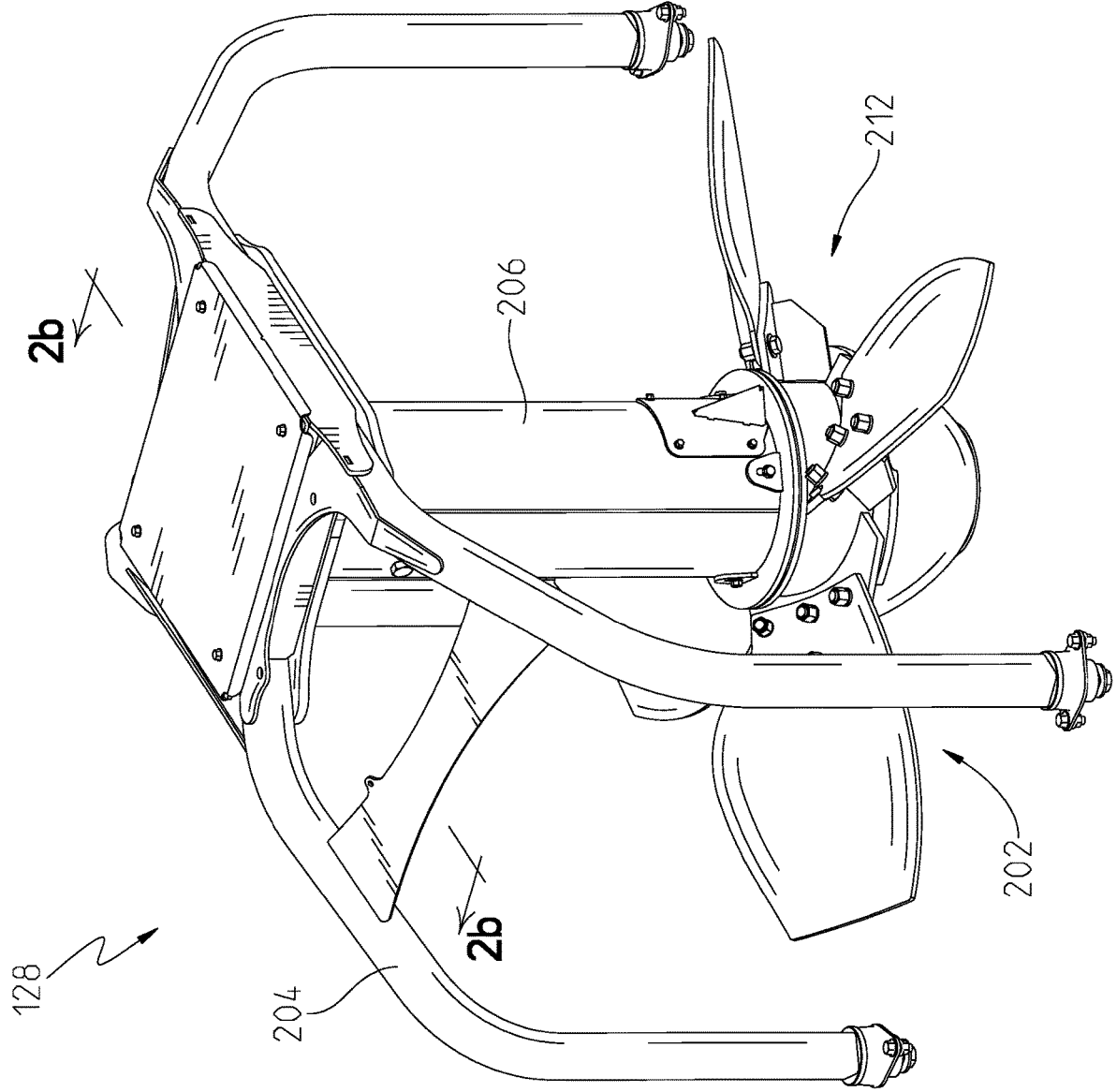
FIG. 2a is an elevated perspective view of a primary extractor separated from the sugarcane harvesting machine of FIG. 1.
Figure 2B:
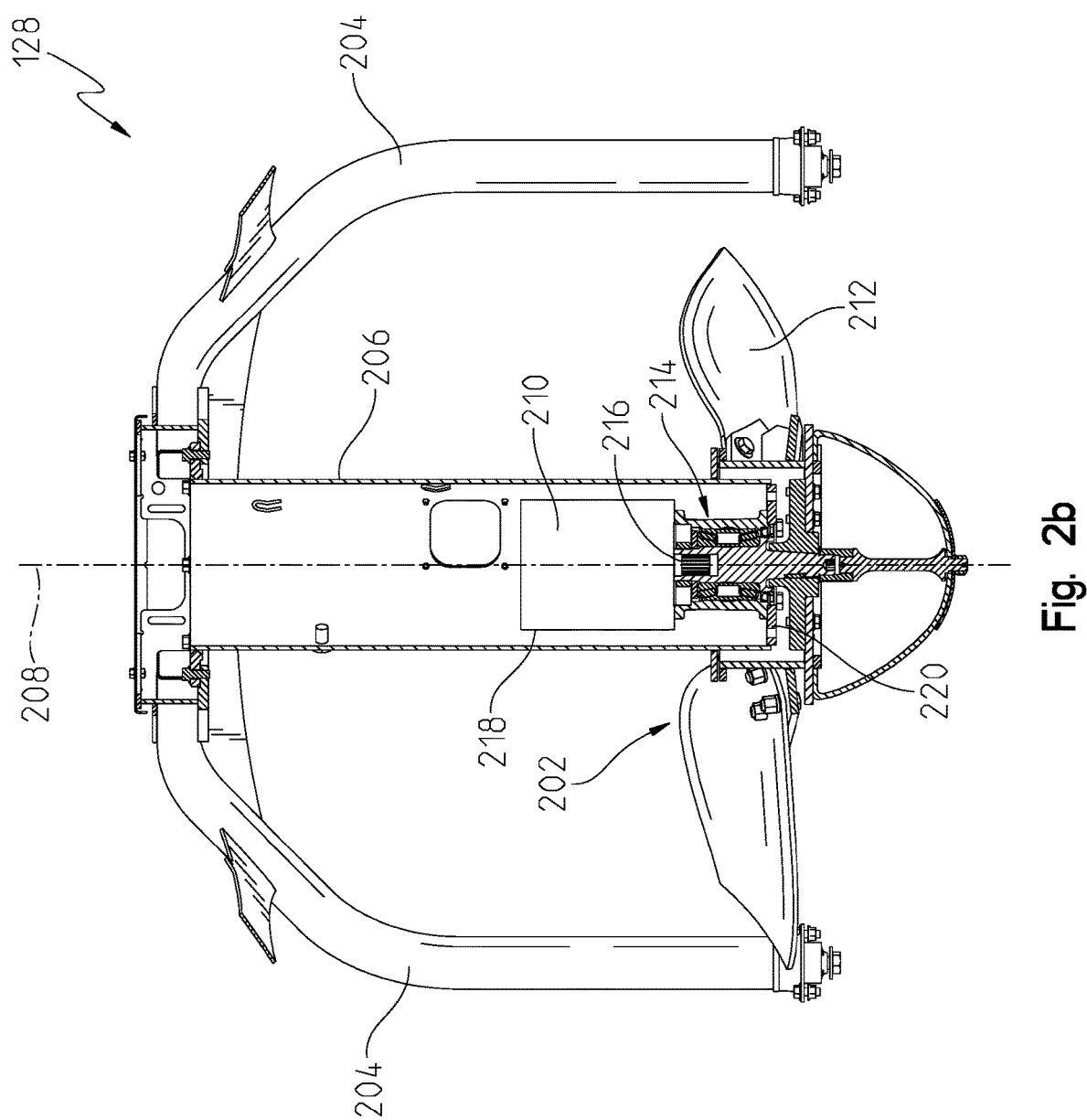
FIG. 2b is a section view of the primary extractor of FIG. 2a through plane A-A.

Referring now to FIGS. 2a and 2b, the primary extractor 128 is illustrated isolated from the machine 100. More specifically, the primary extractor 128 may have a fan assembly 202 positioned therein. The fan assembly 202 may be coupled to the machine 100 with a frame structure 204 or the like. The frame structure 204 may be any structural material capable of supporting the fan assembly 202. In one non-limiting example, the frame structure 204 is one or more tubular arms that are coupled to a portion of the frame 102. While a specific example of the frame structure 204 is illustrated in FIGS. 2a and 2b, any known structural design for such a feature is considered herein, and this disclosure contemplates utilizing a frame structure 204 with more, or less, tubular arms then illustrated herein. Further still, in one embodiment of this disclosure the frame structure 204 may not have tubular arms at all.

The frame structure 204 may provide a structural interface to couple the fan assembly 202 to the frame 102 utilizing a support tube 206. The support tube 206 may extend along an axis 208 away from the frame structure 204. The support tube 206 may be a substantially hollow tube that allows components of the fan assembly 202 to be positioned therein. More specifically, in one aspect of this disclosure the support tube 206 has an inner cavity that is sufficiently sized to house a motor 210. The motor 210 may be an electric, hydraulic, pneumatic, or the like motor and be coupleable to a fan 212 through a bearing coupler assembly 214. Further, in one aspect of this disclosure motor power lines may be routed through the support tube 206 and through or along the frame structure 204 to provide power to the motor 210 from the engine 110 or other power source. The motor power lines may be hydraulic or pneumatic tubes or electrical wires to give a few non-exclusive examples.

In one aspect of this disclosure, the motor 210 may be coupled to the fan 212 through the bearing coupler assembly 214. As discussed in more detail herein, the bearing coupler assembly 214 provides a coupling configuration wherein the motor 210 is coupled to the fan 212 to thereby rotate the fan 212 about the axis 208. In one non-exclusive example of this disclosure, the motor 210 may have a motor shaft 216 that rotates about the axis 208 within a motor housing 218. The motor housing 218 may be coupleable to the bearing coupler assembly 214. In this configuration, the motor shaft 216 may apply torque generated by the motor 210 to rotate the fan 212 through the bearing coupler assembly 214 to thereby generate the flow path of the primary extractor 128.

The bearing coupler assembly 214 may be coupled to the motor 218 on a first end and an end plate 220 at an opposite end. The end plate 220 may be a distal portion of the support tube 206 that provides a mounting surface for the bearing coupler assembly 214. Further, the end plate 220 may define an orifice or the like that allows a bearing shaft of the bearing coupler assembly 214 to pass therethrough to be further coupled to the fan 212 at a distal end. In this configuration, the bearing coupler assembly 214 and motor 210 are substantially positioned within the support tube 206. Further, a housing portion of the bearing coupler assembly 214 and the motor housing 218 may be coupled to the support tube 206 so they remain substantially fixedly coupled relative to the support tube 206 as the motor shaft 216 rotates the fan 212 through the bearing coupler assembly 214.

Figure 3A:
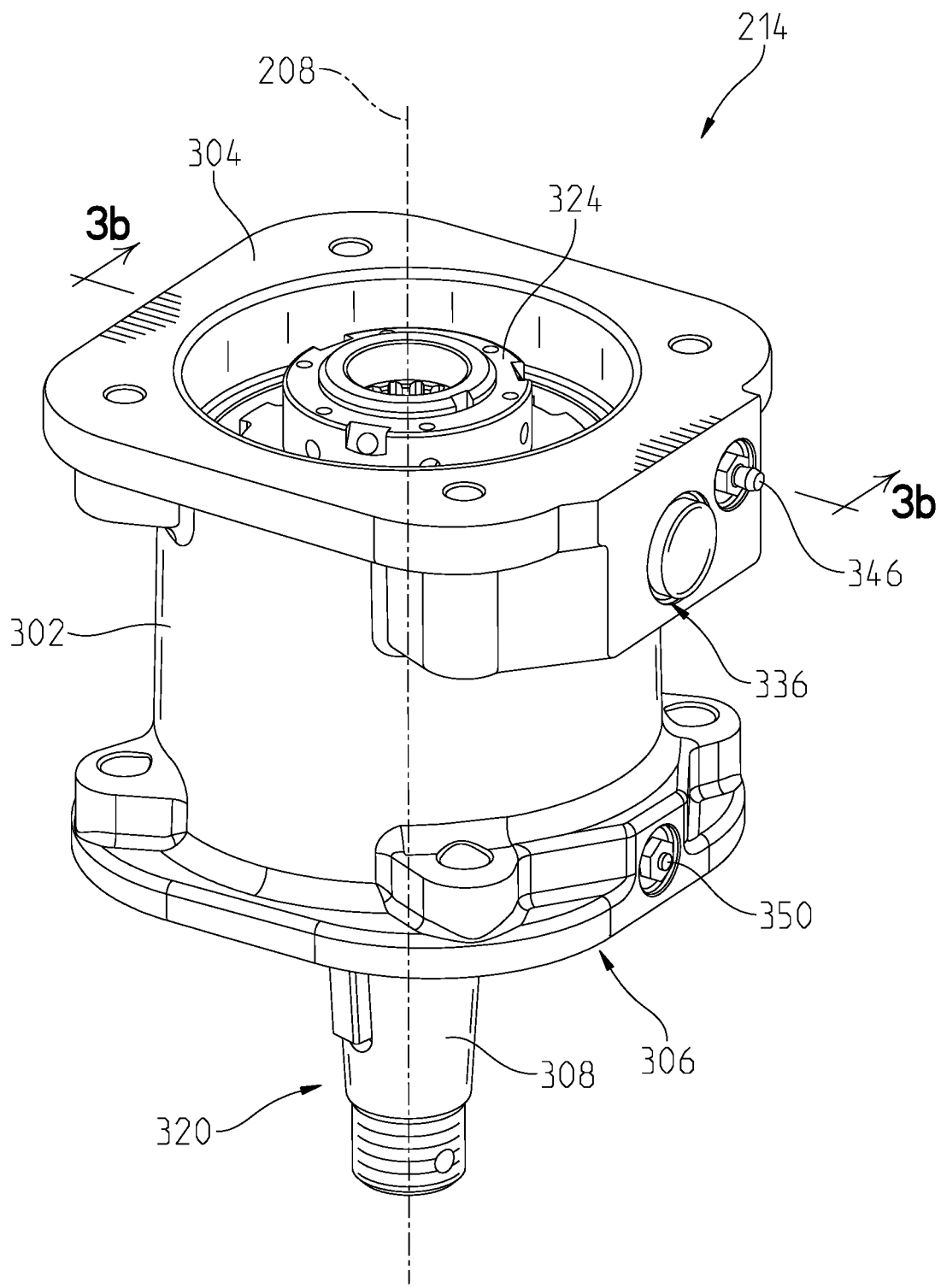
FIG. 3a an elevated perspective view of a bearing coupler assembly separated from the sugarcane harvesting machine of FIG. 1.
Figure 3B:
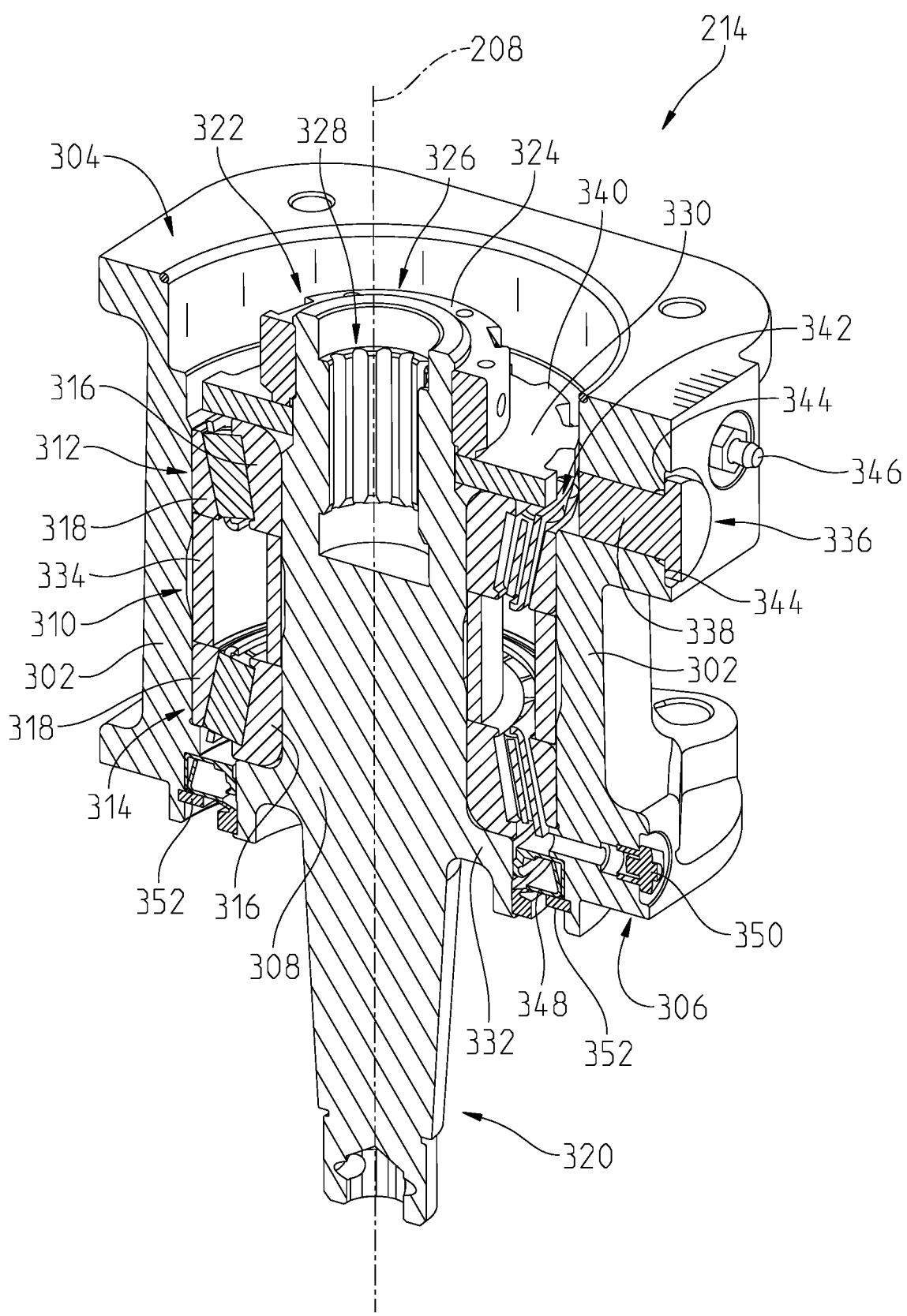
FIG. 3b is a section view of the bearing coupler assembly of FIG. 3a through plane B-B.

Referring now to FIGS. 3a and 3b, an isolated view of the bearing coupler assembly 214 is illustrated. As discussed herein, the bearing coupler assembly 214 may have a bearing housing 302. The bearing housing 302 may have a motor coupling end 304 and an end plate coupling end 306. The motor coupling end 304 may have one or more coupling orifices sized to allow a fastener or the like couple the bearing housing 302 to the motor housing 218. Similarly, the end plate coupling end 306 may have one or more coupling orifice sized to allow a fastener or the like to couple the bearing housing 302 to the end plate 220.

The bearing housing 302 provides a structural base for a bearing shaft 308 to rotate within. More specifically, the bearing shaft 308 may be coupled to the bearing housing 302 with a bearing assembly 310 to thereby allow the bearing shaft 308 to rotate within the bearing housing 302 along the axis 208. The bearing assembly 310 may be any known type of bearing assembly having any number of bearings. However, in one embodiment the bearing assembly may have a first bearing 312 and a second bearing 314. Further, each of the bearings 312, 314 may be tapered roller bearings having respective inner and outer races 316, 318. Further, the bearings 312, 314 may be defined 180 degrees opposite one another about the axis 208.

The bearing shaft 308 may have a fan coupler end 320 and a fastener end 322. The fan coupler end 320 may be sized to extend through the orifice of the end plate 220 to allow the fan 212 to be coupled thereto. The fan coupler end 320 may further be configured to receive a fastener or the like to removeably couple the fan 212 thereto. Further still, the fan coupler end 320 may have a key or other similar member to couple the fan 212 to the fan coupler end 320 of the bearing shaft 308 to ensure the fan 212 rotates with the bearing shaft 308. While a particular configuration for coupling the fan 212 to the bearing shaft 308 is discussed herein, this disclosure contemplates utilizing any known method for coupling a fan to a shaft.

The fastener end 322 may be threadably coupled to a fastener 324 such as a lock nut or the like. More specifically, the fastener end 322 may have a threaded outer surface that is sized to be threadably coupled to the fastener 324 as is known in the art. Accordingly, in one aspect of this disclosure the fastener 324 may be threadably coupled to the fastener end 322 of the bearing shaft 308 to couple the bearing shaft 308 to the bearing assembly 310. While a lock nut is discussed herein, the fastener 324 may be any known fastener that can be coupled to a shaft. Accordingly, the fastener end 322 may be configured to accommodate any known fastener.

The fastener end 322 may also have a motor shaft coupler 326 defined therein. The motor shaft coupler 326 may be a cavity along the fastener end 322 that extends partially into the bearing shaft 308 along the axis 208. The motor shaft coupler 326 may be sized to be coupled to the motor shaft 216 to thereby rotate the bearing shaft 308 when the motor shaft 216 rotates. In one non-exclusive example, the motor shaft coupler 326 may be a splined recess 328 as illustrated in FIG. 3b. In this embodiment, the motor shaft 216 may have a splined end that is sized to be received by the splined recess 328 to rotationally couple the motor shaft 216 to the bearing shaft 308 so rotation of the motor shaft 216 rotates the bearing shaft 308 and in turn the fan 212 when coupled thereto.

In one aspect of this disclosure, the bearing assembly 310 may be at least partially compressed between a tone wheel 330 at the fastener end 322 and a shaft lip 332 proximate to the fan coupler end 320. More specifically, the tone wheel 330 may have sufficient structural properties to apply an axial load to the bearing assembly 310 along the axis 208 towards the shaft lip 332 as the fastener 324 is coupled to the bearing shaft 308 on the fastener end 322. In one embodiment of this disclosure, the inner race 316 of the first bearing 312 may be positioned axially adjacent to the tone wheel 330 along the axis 208. Similarly, the inner race 316 of the second bearing 314 may be positioned axially adjacent to the shaft lip 332. Further, a spacer 334 may be positioned between the outer races 318 of the first and second bearing 312, 314. In this configuration, as the fastener 324 is threadably coupled to the fastener end 322 of the bearing shaft 308, a compressive axial load is applied to the bearings 312, 314 as the fastener 324 compresses the bearings 312, 314 between the tone wheel 330 and the shaft lip 332.

More specifically, as the fastener is coupled to the fastener end 322 the fastener 324 applies an axial load to the tone wheel 330 towards the shaft lip 332. The tone wheel 330 moves along the bearing shaft 308 axially towards the shaft lip 332 as the fastener 324 is tightened. As the tone wheel 330 moves towards the shaft lip 332, the tone wheel contacts the inner race 316 of the first bearing 312 to thereby apply the compressive load of the fastener 324 thereto. Similarly, the outer race 318 of the first bearing 312 may transfer the compressive load to the outer race 318 of the second bearing 314 through the spacer 334. Finally, the outer race 318 of the second bearing 314 may translate the compressive load to the inner race 316 of the second bearing 314. The compressive load may further be resisted as the inner race 316 of the second bearing 314 contacts the shaft lip 332. In other words, as the fastener 324 is tightened, the fastener 324 is moved closer to the shaft lip 332 to compress the inner races 316 of the first and second bearings 312, 314 that in turn loads the bearings to the desired compression load.

In the embodiment utilizing tapered roller bearings, the fastener 324 may be threadably coupled to the fastener end 322 as discussed herein. Further, a coupling torque may be applied to the fastener 324 to thereby couple the fastener to the fastener end 322 of the bearing shaft 308. The compressive force applied to the bearing assembly 310 may depend on the coupling torque applied to the fastener 324. Accordingly, in one aspect of this disclosure the fastener 324 translates the coupling torque to a compressive force that is applied to the bearing assembly 310 through the tone wheel 330. Further, the coupling torque and compressive force may vary per application and be determined based on the type of bearing assembly being utilized.

In another aspect of this disclosure, the bearing housing 302 may have a speed sensor port 336 defined therein. The sensor port 336 may be positioned in a portion of the bearing housing 302 that is proximate to the tone wheel 330. Further, the sensor port 336 may be sized to receive a sensor 338 therein. More specifically, the sensor port 336 may selectively receive a sensor capable of identifying the rotation speed of the bearing shaft 308 as discussed herein.

The tone wheel 330 may also have one or more indicator 340 defined therein. In one embodiment, the indicator 340 may be a radial extension of the tone wheel 330 that has a larger radius than angularly adjacent portions of the tone wheel 330. In another embodiment, the indicator 340 may be a change in material characteristics of the tone wheel 330. Further still, in other embodiments the indicator 340 may be a material cutout of the tone wheel 330. In yet another embodiment, the indicator 340 may be a magnet or the like. In other words, the indicator 340 may be any identifier on, or defined by, the tone wheel 330 that can indicate to the sensor 338 the rotation speed of the tone wheel 330 and in turn the bearing shaft 308.

In the non-exclusive embodiment of FIG. 3, a plurality of indicators 340 may be defined angularly about the circumference of the tone wheel 330 around the axis 208. In this embodiment, when the sensor 338 is positioned within the sensor port 336, the sensor 338 may identify each time an indicator 340 passes thereby. More specifically, in one non-exclusive example the sensor 338 may be an inductive sensor that identifies each time an indicator 340 passes by. In one non-exclusive example, there may be twelve indicators 340 evenly spaced around the tone wheel 330. Each time an indicator 340 passes the sensor 338, the sensor 338 may communicate to a controller that the tone wheel 330 has rotated 1/12 of a rotation since the last time the sensor identified and indicator 340. Any number of indicators 340 could be used, and the embodiment of FIG. 3 is only meant to be one example. More specifically, in another embodiment there may be less than twelve indicators 340. In one example of this embodiment there may be only one indicator 340 that pas the sensor 338 once every rotation of the bearing shat 308. In yet another embodiment, there may be more than twelve indicators 340.

Any number of indicators 340 may be used to provide more or less information regarding the rotational position of the bearing shaft 308. For example, more indicators 340 of the tone wheel 330 may allow the controller to determine the rotation speed of the bearing shaft 308 with greater precision. Accordingly, this disclosure considers utilizing any number of indicators 340 to allow the sensor 338 to identify the rotation speed of the bearing shaft 308 with the requisite precision for many different applications.

The sensor port 336 may be formed in the bearing housing 302 to allow the sensor 338 to be removeably coupled to the bearing housing 302 at a calibration distance 342. The calibration distance 342 may be a preset sensor distance that corresponds with the sensor 338 and the tone wheel 330 to ensure that the sensor 338 is properly spaced to identify when the indicators 340 pass thereby. In one aspect of this disclosure, the sensor 338 may have an outer flange or the like and the sensor port 336 may have a flange surface 344. The sensor 338 may be positioned within the sensor port 336 until the outer flange of the sensor 338 contacts the flange surface 344. At this point, the sensor 338 may be properly spaced from the tone wheel 330 the calibration distance 342. In other words, the sensor port 336 may be specifically spaced from the tone wheel 330 to allow the sensor 338 to be spaced the calibration distance 342 when inserted therein.

The bearing housing 302 may also have one or more grease fitting 346 coupled thereto. The grease fitting 346 may provide a fluid channel through the bearing housing 302 to allow grease or any other lubricant to be pumped into the bearing housing 302 to lubricate the bearing assembly 310 among other things. Further still, a grease seal 348 may be positioned about the bearing shaft 308 at an area radially outwardly from the shaft lip 332. The grease seal 348 may substantially fluidly seal the bearing shaft 308 and the bearing housing 302 along the portion of the bearing shaft 308 proximate to the shaft lip 332. Further, a relief valve 350 may provide a location to exhaust lubricant or the like when the pressure and volume of grease applied through the grease fitting 346 is greater than a threshold.

The relief valve 350 may be positioned axially along the axis 208 between the grease seal 348 and the outer race 318 of the second bearing 314 and the grease fitting 346 may be located axially away from the outer race 318 of the first bearing 312 away from the relief valve 350. When the motor 210 is coupled to the bearing coupler assembly 214 as in FIGS. 2a and 2b, the motor housing 318 may substantially restrict lubricant or the like from flowing out of the bearing housing 302 towards the motor 210. Accordingly, when the motor 210 is coupled to the bearing coupler assembly 214 and an adequate volume and pressure of lubricant or the like is applied through the grease fitting 346, the lubricant or the like can be forced through the bearing assembly 310 towards the relief valve 350. Routing the lubricant in such a manner allows the bearing assembly 310 to be fully lubricated when lubricant or the like is applied as discussed herein. Further, the tone wheel 330 may be at least partially exposed to the lubricant or the like and allow it to flow axially past the tone wheel 330 towards the relief valve 350 to ensure the bearing assembly 310 receives proper lubrication.

In yet another aspect of this disclosure the grease seal 348 may be coupled to the bearing housing 302 with a snap ring 352. The snap ring 352 may be formed of an elastic material and sized to deform to fit within an annular groove defined within the bearing housing 302. Once the grease seal 348 is properly positioned about the bearing shaft 308 and within the bearing housing 302, the snap ring 352 may be deformed and positioned within the annular groove of the bearing housing 302 to thereby maintain proper positioning of the grease seal 348.

In one aspect of this disclosure, the bearing coupler assembly 214 may substantially protect the motor 210 from being damaged by an imbalanced fan 212. More specifically, the motor 212 may be coupled to the fastener end 322 of the bearing shaft 308 with a coupling method that allows some movement of the motor shaft 216 relative to the bearing shaft 308 (such as the splined recess 328 discussed herein). By allowing some relative movement of the motor shaft 216, the bearing shaft 308 may be primarily affected by an improperly balanced fan 212. In this configuration, the bearing coupler assembly 214 may be easily removed and replaced as needed. In other words, the motor 212 is substantially protected from damage if the fan becomes imbalanced. Further still, by integrating the tone wheel 330 and sensor 338 into the bearing coupler assembly 214 to space the sensor 338 the calibration distance from the tone wheel 330, the speed of the fan 212 can be easily and accurately monitored without requiring difficult calibration protocols or the like.

While this disclosure has primarily referred to the primary extractor 128 of a sugarcane harvester, the teachings discussed herein can be applied to any machine that utilizes a motor to drive a shaft. More specifically, in one embodiment the teachings discussed herein can be implemented on the second extractor 136 as well. Further still, in other embodiments the bearing coupler assembly 214 may be implemented on machines that are not agricultural at all. A person skilled in the relevant art understands the many different applications for the teachings of this disclosure.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A bearing coupler assembly, comprising:
   a bearing housing sized to at least partially receive a bearing assembly, the bearing housing defining a bearing axis therethrough;
   a shaft positioned at least partially through the bearing housing along the bearing axis, the shaft defining a shaft lip and a fastener end, the bearing assembly coupling the shaft to the bearing housing so the shaft can rotate about the bearing axis relative to the bearing housing;
   a motor shaft coupler defined in the shaft, the motor shaft coupler comprising a splined recess defined within the shaft;
   a fastener configured to be coupled to the fastener end of the shaft;
   a tone wheel positioned axially along the bearing axis between the fastener and the bearing assembly, the tone wheel having at least one indicator;
   a sensor coupled to the bearing housing and configured to identify when the indicator passes thereby;
   wherein, the tone wheel rotates with the shaft and the sensor is configured to identify the rotation speed of the tone wheel;
   further wherein, the fastener applies a force on the tone wheel towards the shaft lip to provide an axial load to the bearing assembly.

2. The bearing coupler assembly of claim 1, further comprising a sensor port defined in the bearing housing, wherein the sensor port establishes a calibration distance to the tone wheel.

3. The bearing coupler assembly of claim 1, further wherein the at least one indicator is a radial extension defined in the tone wheel.

4. The bearing coupler assembly of claim 1, further wherein the at least one indicator includes a plurality of radial extensions defined in the tone wheel.

5. The bearing coupler assembly of claim 1, further wherein the fastener end of the shaft is threaded and the fastener is a nut, wherein the nut is threadably coupled to the fastener end at a torque value to apply the force on the tone wheel.

6. The bearing coupler assembly of claim 1, further wherein the tone wheel directly contacts the fastener.

7. The bearing coupler assembly of claim 1, further wherein the fastener applies the force to the tone wheel towards the bearing assembly to compress the bearing assembly between the tone wheel and the shaft lip.

8. The bearing coupler assembly of claim 1, further wherein the bearing assembly comprises at least one tapered roller bearing.

9. The bearing coupler assembly of claim 8, further wherein the bearing assembly comprises a first tapered roller bearing and a second tapered roller bearing.

10. The bearing coupler assembly of claim 9, further wherein the first and second tapered roller bearings are positioned substantially one-hundred and eighty degrees opposed to one another along the bearing axis so an inner race of the first bearing contacts the tone wheel and an inner race of the second bearing contacts the shaft lip.

11. The bearing coupler assembly of claim 1, further wherein the motor shaft coupler is defined at least partially radially inward of the tone wheel.

* * * * *